US007252709B2

(12) United States Patent
Narayan-Sarathy et al.

(10) Patent No.: US 7,252,709 B2
(45) **Date of Patent: *Aug. 7, 2007**

(54) MULTIFUNCTIONAL ACRYLATE OLIGOMERS AS PIGMENT GRINDING VEHICLES FOR RADIATION-CURABLE INK APPLICATIONS

(75) Inventors: Sridevi Narayan-Sarathy, Dublin, OH (US); Lisa M. Hahn, Delaware, OH (US); Michael Gould, Powell, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 267 days.

This patent is subject to a terminal disclaimer.

(21) Appl. No.: 10/682,875

(22) Filed: Oct. 14, 2003

(65) Prior Publication Data

US 2005/0080202 A1 Apr. 14, 2005

(51) Int. Cl.
*C09D 11/00* (2006.01)
*C08L 33/00* (2006.01)

(52) U.S. Cl. ............... 106/31.85; 106/31.6; 106/31.86; 106/31.9; 525/242; 525/540

(58) Field of Classification Search .................. 525/50, 525/55, 107, 123, 165, 178, 191, 242, 418, 525/452, 523, 539, 540

See application file for complete search history.

(56) References Cited

U.S. PATENT DOCUMENTS

| | | | | |
|---|---|---|---|---|
| 6,300,388 | B1 * | 10/2001 | Verdonck et al. | 522/173 |
| 6,673,851 | B2 * | 1/2004 | Moy et al. | 522/173 |
| 2003/0119943 | A1 * | 6/2003 | Tucker et al. | 523/160 |
| 2005/0027082 | A1 * | 2/2005 | Narayan-Sarathy et al. | 525/471 |
| 2005/0080162 | A1 * | 4/2005 | Narayan-Sarathy et al. | 523/160 |

OTHER PUBLICATIONS

Ross Planetary Mixer Information: provided by Ross website (www.planetarymixers.com).*

U.S. Appl. No. 10/682,874.*

* cited by examiner

*Primary Examiner*—Michael J. Feely

(57) ABSTRACT

The invention detailed herein comprises a family of multifunctional acrylate oligomers which are useful as pigment grinding vehicles for use in radiation-curable coating formulations. The multifunctional acrylate resins are formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl compounds or Michael "donors" that can participate in the Michael addition reaction. These resin vehicles have a built-in chromophore that enables ink formulations made from their dispersions to cure under standard UV-cure conditions with significantly less photoinitiator than commercial formulations. The resins also exhibit excellent pigment wetting characteristics and can be designed to function as a single dispersion vehicle for different pigments and different ink applications such as screen, flexographic, and lithographic printing.

30 Claims, 1 Drawing Sheet

4 TMPEOTA + 2 amine-modified polyether acrylate

4 DPGDA 0.42 Ethyl acetoacetate

Base Catalyst

Ashland D-30R Polyacrylate Resin

Ashland D-30R Polyacrylate Resin

MULTIFUNCTIONAL ACRYLATE OLIGOMERS AS PIGMENT GRINDING VEHICLES FOR RADIATION-CURABLE INK APPLICATIONS

FIELD OF THE INVENTION

The present invention relates generally to pigment dispersions for UV-curable inks. The present invention relates particularly to Michael Addition polyacrylate resins and pigment dispersions fabricated from such resins.

BACKGROUND

Increased emphasis on environmental considerations is a driving force advancing the utilization of energy-curable ink technology in the printing and graphic arts industry. Energy-curable inks comprise ultraviolet light (UV-curable) and electron beam radiation (EB-curable) inks. Achieving good quality UV inks is strongly correlated with the final rheology of the system. Rheology is determined by the conformation that the vehicle adopts when wetting the pigment surface. Stable dispersion of the pigment in ink formulations, good ink flow and transfer on press, and subsequent color strength all depend upon pigment wetting.

Pigment wetting can be described as a chemical interaction between the binder and the pigment that helps prevent the flocculation process and enhances the color of the printed ink. The rheological advantages of a well-wetted system are good flow characteristics, low overall ink viscosity, high gloss and proper color development. UV-curable oligomers are available commercially. However, inks based upon conventional oligomers disadvantageously require substantial amounts of various photoinitiators to ensure acceptable photo-cure. Traditional photoinitiators (e.g., benzophenone) can be toxic, expensive, malodorous, and may contribute to film color, which can limit their applicability, in general, and may render them unsuitable for use in white and light-colored inks.

The amount of external photoinitiator in ink formulations can be significantly reduced by using the acrylate oligomer technology described in U.S. Pat. Nos. 5,945,489 and 6,025,410 (both Ashland, Inc.). These patents disclose uncrosslinked resins prepared via the Michael addition reaction of β-dicarbonyl compounds with multifunctional acrylates. The invention disclosed here demonstrates the advantageous use of these uncrosslinked resins alone or modified by reaction with and/or blending with additional materials for grinding different color pigments. These additional materials include a variety of acrylic monomers and oligomers, primary, secondary and tertiary amines, acid functional materials, dispersing agents, pigment wetting aids and others to enhance pigment wetting characteristics. The resulting pigment dispersions can be let-down with appropriate oligomers based on the same Michael Addition resin technology to give UV-curable screen, flexographic, ink-jet and lithographic inks.

The invention detailed herein comprises a family of pigment dispersions for radiation-curable printing ink applications. These dispersions are based on multifunctional acrylate resins formed by the reaction of acrylate monomers and oligomers with β-keto esters (e.g., acetoacetates), β-diketones (e.g., 2,4-pentanedione), β-keto amides (e.g., acetoacetanilide, acetoacetamide), and/or other β-dicarbonyl or Michael "donor" compounds that can participate in the Michael addition reaction combined with a variety of organic and inorganic pigments. An essential novelty of these pigment dispersion vehicles is that the inks based on them will cure under standard UV-cure conditions with very little traditional photoinitiator as compared to commercial formulations which require the addition of substantial amounts of photoinitiator.

The multi-functional polyacrylate oligomers which are used as pigment grinding vehicles in the present invention have dual chemical functionality. That is, they have both acrylic functionality and a labile ketone group that is capable of dissociating, upon exposure to UV radiation, to initiate free radical polymerization of the oligomer.

Pigment wetting and dispersion properties can be modified by various means including the use of additional or supplementary acrylate materials, using various β-dicarbonyl Michael donor compounds, or by simply varying the stoichiometry of the reactants which comprise the oligomer. Inks based on these pigment dispersions may be cured via chemical means, thermally, or by exposure to UV or electron beam radiation. Other materials, both reactive (e.g., conventional polyacrylates or acrylated oligomers) and non-reactive (e.g., thermoplastic polyacrylates such as PMMA), may also be incorporated into dispersion formulations to enhance the pigment wetting characteristics of these resins. Such additives include, but are not limited to, various acrylic monomers and oligomers; primary, secondary, and tertiary amines; and acid-functional monomers and oligomers.

Dispersion systems comprised of traditional monomers and oligomers often have compatibility issues with some of the above additives, giving the formulations chemist fewer options. However, dispersions built from the novel photocurable Michael Addition resins described herein can incorporate a nearly unlimited variety of additives due to the chemical/architectural control possible in their synthesis. Thus, many more options are available to the formulator who must address challenges specific to each printing application.

SUMMARY OF INVENTION

The present invention addresses these perceived needs by providing a Michael resin for a pigment dispersion. The inventive Michael dispersion resin comprises a plurality of covalently-linked constituents. Each constituent, which may be a monomeric or oligomeric unit, serves at least one specific function thereby contributing to the solution of the problems recited above. A constituent may serve more than one function.

The present invention provides a Michael resin for a pigment dispersion comprising a monomer (or oligomer) functioning as a Michael acceptor in the resin synthesis. Moreover, this constituent provides pendant acrylate groups for crosslinking the resin into a thermoset. Constituents suited to this function include, but are not limited to, polyester acrylates, epoxy acrylates, urethane acrylates, acrylic monomers, and mixtures thereof.

The present invention provides a Michael resin for a pigment dispersion comprising a monomer (or oligomer) serving the function of pigment wetting. Constituents suited to this function include, but are not limited to, polyester acrylates, epoxy acrylates, urethane acrylates, acrylic monomers, and mixtures thereof.

The present invention provides a Michael resin for a pigment dispersion comprising a monomer (or oligomer) serving the function of pigment dispersion stabilization. Constituents suited to this function include, but are not limited to, alkoxylated nonylphenol acrylates, polyester acrylates, epoxy acrylates, urethane acrylates, acrylic monomers, alkoxylated acetoacetates and mixtures thereof.

The present invention provides a Michael resin for a pigment dispersion comprising a monomer (or oligomer) serving the function of viscosity control. Constituents suited to this function include, but are not limited to: polyester acrylates, epoxy acrylates, urethane acrylates, acrylic monomers, and mixtures thereof. Such constituents specifically include ethylene glycol diacrylate, propylene glycol diacrylate, diethylene glycol diacrylate, dipropylene glycol diacrylate (DPGDA), triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, glycerol triacrylate, ethoxylated trimethylolpropane triacrylate (TMPEOTA), propoxylated trimethylolpropane triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates, and mixtures thereof.

The present invention provides a Michael resin for a pigment dispersion comprising a monomer or oligomer or constituent serving the function of cure enhancement of the final ink formulation. Constituents suited to this function include, but are not limited to: amine-modified polyacrylates including amine-modified polyethers, amine-modified polyesters, amine-modified epoxy acrylates and amine-modified urethane acrylates; amino acrylates and mixtures thereof.

The present invention provides a Michael resin for a pigment dispersion comprising a constituent serving the function of Michael donor and providing a photolabile chromophore. Constituents suited to this function include, but are not limited to: ethyl acetoacetate (EAA), methyl acetoacetate, 2-ethylhexyl acetoacetate, lauryl acetoacetate, t-butyl acetoacetate, acetoacetanilide (AAA), N-alkyl acetoacetanilide, acetoacetamide, 2-acetoacetoxylethyl acrylate, 2-acetoacetoxylethyl methacrylate, allyl acetoacetate, benzyl acetoacetate, 2,4-pentanedione (2,4-PD), 2,4-hexanedione, 3,5-heptanedione, isobutyl acetoacetate, and 2-methoxyethyl acetoacetate (2-MEAA), 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate (TMPTA), polycaprolactone triacetoacetates, pentaerythritol tetraacetoacetate, long chain alkoxylated acetoacetates and mixtures thereof.

The present invention provides a Michael resin for a pigment dispersion comprising up to about 90 parts by weight of a monomer or oligomer having the function of pigment wetting.

The present invention provides a Michael resin for a pigment dispersion comprising up to about 50 parts by weight of a monomer or oligomer having the function of pigment stabilization.

The present invention provides a Michael resin for a pigment dispersion comprising up to about 90 parts by weight of a monomer or oligomer having the function of viscosity control.

The present invention provides a Michael resin for a pigment dispersion comprising up to about 90 parts by weight of a monomer or oligomer or constituent having the function of cure enhancement of the final ink formulation.

The present invention provides a Michael resin for a pigment dispersion comprising up to about 40 parts by weight of a constituent having the function of Michael donor and providing a photolabile chromophore.

An aspect of the present invention provides a Michael resin pigment dispersion, comprising from about 10 parts, by weight, to about 90 parts, by weight, of a Michael dispersion resin; and from about 10 parts, by weight, to about 75 parts, by weight, of a pigment.

An aspect of the present invention provides control over resin design, such that, a single resin with excellent pigment wetting properties can serve as a vehicle for grinding different color pigments. A further aspect of the present invention provides control over resin design such that the system rheology may be tailored to suit individual applications.

An aspect of the present invention provides resins modified to incorporate molecules known to the art to confer excellent dispersing properties to further aid pigment wetting characteristics.

An aspect of the present invention provides resins permitting a dramatic reduction in the amount of time needed to disperse a pigment as compared to conventional dispersing vehicles. A further aspect of the present invention provides resins permitting higher pigment loadings than are possible with conventional acrylate-based pigment dispersing vehicles.

Pigment dispersions based on the Michael Addition resins described above can be further formulated to give inks that are cured by all methods typically used to crosslink acrylic materials. Cure, or crosslinking, is usually accomplished through a free radical chain mechanism, which may require any of a number of free radical-generating species such as peroxides, hydroperoxides, REDOX combinations, etc. Such species decompose to form radicals when heated, or decompose at ambient temperatures in the presence of amines or transition metal promoters. Ultraviolet (UV) light or electron beam (EB) radiation are other means of initiating reaction by decomposing an appropriate photoinitiator to form free radicals. Pigment dispersions based on the novel acrylate oligomers described in this invention offer significant advantages over dispersions based on traditional multifunctional acrylic monomers and oligomers because inks based on them can be cured by exposure to UV radiation with a fraction of the photoinitiator required for standard UV-cure inks.

BRIEF DESCRIPTION OF DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing is the following figure.

Figure 1:
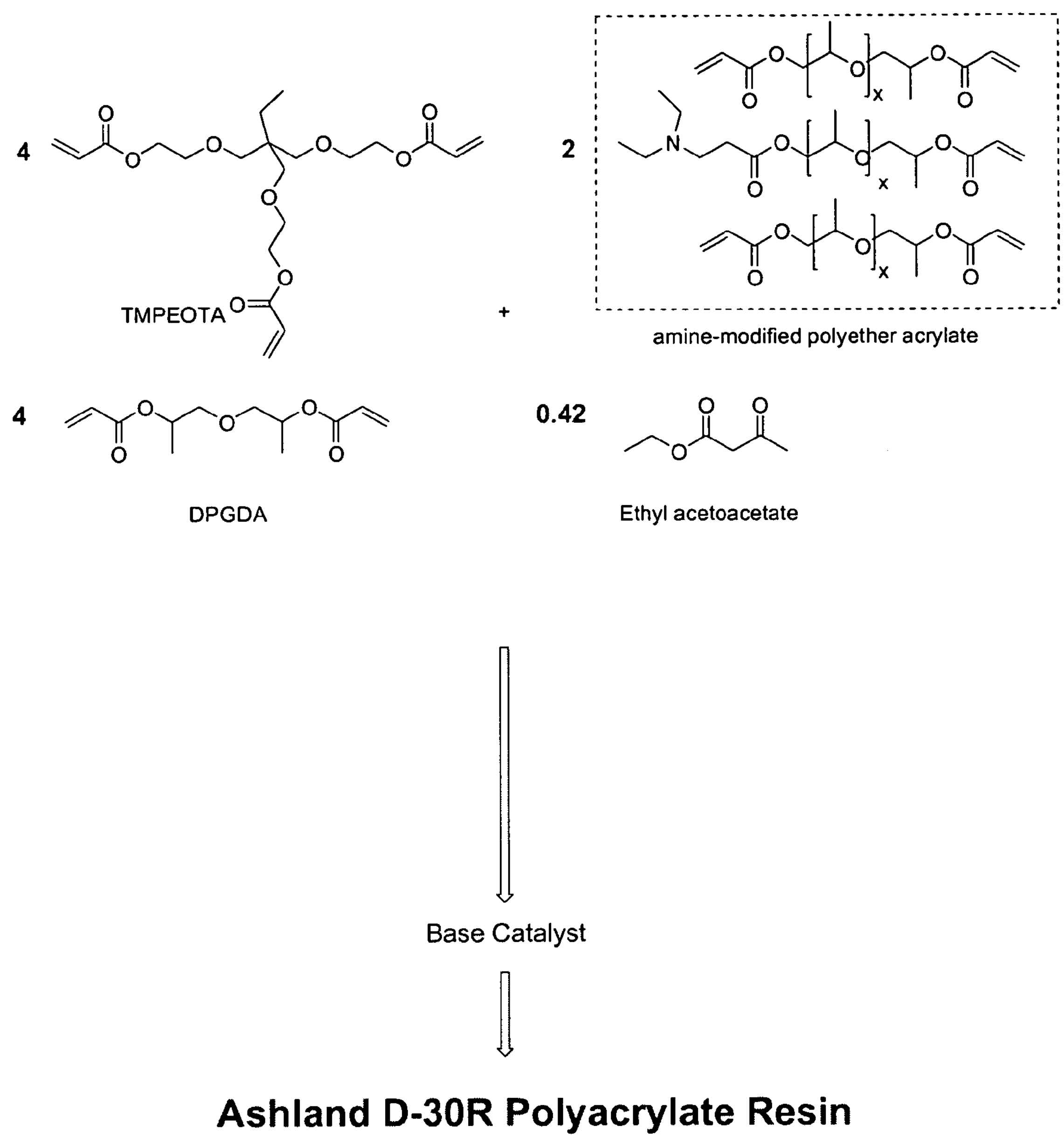
FIG. 1 is a schematic of the synthesis of Ashland D-30R.

It is to be noted, however, that the appended drawings are illustrative only and do not limit the scope of the invention.

BEST AND VARIOUS MODES

Industry standard pigments were chosen to compare the dispersion power of the UV-cure resins of the present invention against conventional UV-cure resins. The chosen white pigment was Titanium Dioxide White DuPont R-706. The yellow pigment chosen was Pigment Yellow 14 YE 1400 DC (diarylide yellow, Magruder Color Company). The chosen blue pigment was Pigment Blue 15:3 BL-1531 (phthalocyanine blue, Magruder Color Company). The chosen red pigment was Pigment Red 57:1 LR-1392 (metallized azo red, Magruder Color Company). The various pigments were chosen as being standard to the industry. The present invention is not limited to the recited pigments. Persons of skill in the industry may readily determine other suitable pigments.

The present invention is not limited to the exemplary colors (white, yellow, blue, and red). Rather, the invention is suitably practiced with any pigment of any color, including, but not limited to benzimidazolone pigments, carbazole violet, dianisidine and diarylide orange, carbon black, phthalocyanine green (Pigment Green 7 and 36), metallized azo reds, naphthol reds, quinacridone reds, zinc oxide, barium sulfate, diarylide yellow, arylide yellow, benzimidazolone yellows, phthalocyanine blues organic, and inorganic pigments.

For benchmark evaluations, dry pigment was mixed with resin and pre-dispersed in a Hauschild mixer at 2500 rpm for 1 minute to wet out the surface of the pigment particles and agglomerates. Final dispersion of the process colors was performed on a Lehmann 2.5×5 inch laboratory scale 3-roll mill. The dispersions were prepared on a 60 g scale. The mixtures were passed across the mill an equal number of times in order to ensure that the same level of grinding had been achieved. Residual pigment agglomerates were visualized using a NPIRI grind gauge. The pigment loading was at 30% in all the dispersions except for the white pigment, which was loaded at 70%. Color development of the dispersions was evaluated by tint strength and clear bleach tests.

NPIRI grind: A small amount of the dispersion (enough to draw down on the gauge) is placed on a glass or plastic slab and let-down with an equal amount of the oligomer used to disperse the pigment. After mixing well with a spatula, a dime-sized amount is applied to the top of both grind paths on the gauge. A drawdown is made using the scraper, being careful to move the scraper smoothly, and with moderate pressure (so as not to leave a noticeable film of ink between the two grind paths). The inception of scratches and "pepper" on the gauge, as marked by the NPIRI readings along the side of the grind path, is noted. NPIRI measures "fineness of grind" and is referenced in ASTM standards D1210, D1316, and D333 each of which is incorporated in its entirety by reference.

TINT STRENGTH TEST: Fifty parts of a pre made white UV curing ink (55% DuPont R-706 and 45% Resin 6923-30, dispersed on the 3-roll mill) are combined with 0.500 parts of the pigment dispersion in a Max 60 container. Mixing is done using a Hauschild mixer at 2500 rpm for 2 minutes. Drawdowns of standards vs. samples on Leneta 3NT-3 paper are made using a wide putty knife, making sure the drawdown is thick enough so that the black bar cannot be seen through the ink film. The wet film is covered with a piece of 6 mil acetate using a clean putty knife to draw down the film on the dispersion to prevent air entrainment under the acetate. Color strength is measured using a hand-held Byk Gardner spectrophotometer.

CLEAR BLEACH TEST: Five parts of the dispersion are combined with 45 parts of clear resin PP 3204R in a Max 60 container. A small amount of a photoinitiator, Viacure® DX (Trademark of UCB Chemicals) is added to the mixture to ensure photo-curing without any surface tack. The UCB ViaCure® DX vehicle is a mixture of photo-initiators optimized for the dark color ink formulations. Mixing is done on a Hauschild mixer at 2500 rpm for one minute and 3000 rpm for 30 sec. Prints of sample vs. standard are rolled out on Leneta 3NT-3 paper using a hand-proofer and curing is accomplished by exposure to a single 600 W Fusion "H" bulb at ~1000 mJ/cm$^2$ dose. Gloss and color values are measured using a hand-held Byk Gardner spectrophotometer.

Viscosity: Cone and plate viscosity of dispersions are measured using a Brookfield CAP 2000L Viscometer at a specified RPM, temperature and time.

The Michael resins of the present invention were synthesized according to the procedures set forth in U.S. Pat. Nos. 5,945,489 and 6,025,410, both assigned to Ashland Inc., the assignee of the present invention. The entire contents of each of these patents are expressly incorporated by reference for all purposes.

The various resins of the present invention are each synthesized from a plurality or monomers. Each monomer is chosen to perform at least one function.

The present invention provides a Michael resin for a pigment dispersion comprising up to about 90 parts of a monomer such as TMPEOTA (ethoxylated trimethylol propane triacrylate) having the function of pigment wetting. TMPEOTA serves as a Michael acceptor and is reacted at a stoichiometry such that, prior to exposure to actinic light or other free radical initiator, the resultant resin is not crosslinked and contains pendant acrylate groups. The pendant acrylate groups, conferred by TMPEOTA are then available for crosslinking upon exposure to free radicals.

The Michael acceptor, pendant acrylate group conferring, and pigment wetting functions may be served by other acrylates including, but not limited to polyester acrylates, epoxy acrylates, urethane acrylates and acrylic monomers, from monofunctional (EOEOEA, PEA, etc.) to multifunctional (PETA, di-TMPTA, etc.). These monomers and oligomers span all classes of such commercial acrylate materials, including amine-modified, alkoxylated, dual functional (e.g., allyl acrylate, siloxane acrylate) and/or physically unique (e.g., crystalline).

The present invention provides a Michael resin for a pigment dispersion comprising up to about 90 parts by weight of a monomer such as alkoxylated nonylphenol acrylate having the function of pigment dispersion stabilization.

The Michael acceptor, pendant acrylate group conferring, and pigment dispersion stabilization functions of alkoxylated nonylphenol acrylate may be served by other acrylates including, but not limited to the categories and classes noted in the preceding section.

The present invention provides a Michael resin for a pigment dispersion comprising up to about 90 parts by weight of a monomer such as DPGDA having the function of viscosity control.

The Michael acceptor, and pendant acrylate group conferring, and viscosity control functions served by DPGDA may be served by other acrylates including, but not limited to ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, aryl urethane diacrylate, aliphatic urethane diacrylate, polyester diacrylate, and mixtures thereof, glycerol triacrylate, ethoxylated trimethylolpropane triacrylate, propoxylated trimethylolpropane triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, and mixtures thereof, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates, polyester tetraacrylates and mixtures thereof.

The present invention provides a Michael resin for a pigment dispersion comprising up to about 90 parts by weight of a monomer, oligomer, or other constituents having the function of cure enhancement of final ink formulation.

The Michael acceptor and pendant acrylate group conferring functions of cure enhancement of the final ink formulation may be served by acrylates including, but not limited to amine-modified polyether, polyester, epoxy or urethane acrylates, amino acrylates and the like and primary or secondary amines capable of undergoing pseudo Michael Addition reactions with acrylate moieties and combination thereof.

The present invention provides a Michael resin for a pigment dispersion comprising up to about 50 mole % of a constituent such as ethyl acetoacetate (EAA) having the function of Michael donor and providing a photolabile chromophore to introduce cure-promoting free radicals upon exposure to actinic radiation. EAA is a β-dicarbonyl compound serving as the donor in the Michael synthetic reaction.

The β-dicarbonyl donor, and photolabile chromophore introducing, functions of EAA may be served by other compounds including, but not limited to, methyl acetoacetate, 2-ethylhexyl acetoacetate, lauryl acetoacetate (dodecyl acetoacetate), t-butyl -acetoacetate, acetoacetanilide, N-alkyl acetoacetanilide, acetoacetamide, 2-acetoacetoxylethyl acrylate, 2-acetoacetoxylethyl methacrylate, allyl acetoacetate, benzyl -acetoacetate, 2,4-pentanedione, 2,4-hexanedione, 3,5-heptanedione, isobutyl acetoacetate, 2-methoxyethyl acetoacetate, 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate, glycerin or trimethylol propane triacetoacetate, polycaprolactone triacetoacetates, long chain alkoxylated acetoacetates, pentaerythritol tetraacetoacetate.

TABLE I

Definitions of Benchmarking Dispersion Resins

| Resin | Composition | Molar ratio | Viscosity (poise) |
|---|---|---|---|
| Ashland D-30R | TMPEOTA | 1.0 | 12.20 |
| | DPGDA | 1.0 | |
| | polyester acrylate | 0.5 | |
| | EAA | 2.4 | |
| PP3204R | HDDA | 17.0 | 7.08 |
| | epoxy acrylate | 2.0 | |
| | TMPTA | 1.0 | |
| | EAA | 1.0 | |
| | 2,4-pentanedione (2,4-PD) | 2.6 | |
| | DEA | 0.2 | |

EXAMPLE 1

Comparative Benchmarking of Blue Pigment Dispersions

The blue pigment BL-1531 was pre-dispersed in a Hauschild mixer and subsequently ground at 30% loading in all resins using a 3-roll mill. The grind formulation is specified in Table II.

TABLE II

Generic Formulation for Blue Pigment Dispersions.

| Component | Description | Parts (w/w) |
|---|---|---|
| Resin | dispersion resin | 42.0 |
| BL-1531 | Blue pigment | 18.0 |

The resins used to form blue pigment dispersions are defined in Table III. UCB Viascreen® and Viaflex® vehicles are a mixture of monomers and oligomers that have been optimized for screen and flexographic ink applications respectively. (Viascreen and Viaflex are both trademarks of UCB Chemicals).

TABLE III

Definition of Experimental Oligomers.

| Resin | Description | Viscosity (Poise) |
|---|---|---|
| Ebecryl 3411 | epoxy acrylate | 498.70 |
| ViaFlex 165 | UCB flexo grinding vehicle | 26.50 |
| Via-Screen 515 | UCB screen grinding vehicle | |
| 7008-135 Ashland D-30R | TMPEOTA/DPGDA/0.50 polyester acrylate/EAA 2.4 | 10.46 |
| 7008-136 | TMPEOTA/TRPGDA/0.50 polyester acrylate/EAA 2.4 | 11.11 |
| 7008-137 | TMPEOTA/HDDA/0.50 polyester acrylate/EAA 2.4 | 10.95 |
| 7008-138 | TMPEOTA/DEGDA/0.50 polyester acrylate/EAA 2.4 | 11.71 |
| 7008-139 | 4 TMPEOTA 13 DPGDA/SR 259 (E200 diacrylate) 1 0.50 polyester acrylate 1 EAA 2.4 | 12.35 |
| 7008-140 | 4 TMPEOTA 13 DPGDA/SR 344 (E400 diacrylate) 1 0.50 polyester acrylate 1 EAA 2.4 | 11.50 |

TABLE III-continued

Definition of Experimental Oligomers.

| Resin | Description | Viscosity (Poise) |
|---|---|---|
| 7001-110 | TMPEOTA/DPGDA/2-methoxyethyl acetoacetate 2.6/0.20 piperidine | 11.65 |
| 7001-136 | Genomer 3497 polyether acrylate/4 DPGDA/2-methoxyethyl acetoacetate 2.6/0.20 DEA | 14.15 |
| 7001-106 | 3 TMPEOTA/7 DPGDA/2-methoxyethyl aceto-acetate 2.6/0.20 piperidine | 8.45 |
| 7001-191 | 3 TMPEOTA/5 DPGDA/0.70 SR 504 alkoxylated nonylphenol acrylate/EAA 2.6/0.20 DEA | 20.30 |
| 7069-01 | 3 TMPEOTA/4 DPGDA/SR 504 alkoxylated nonylphenol acrylate/2 polyester acrylate/ EAA 2.4 | 26.25 |

Viscosity (Poise) at 25° C. Coefficients represent molar ratios.

EXAMPLE 2

Comparative Evaluation of the Pigment Dispersions

TABLE IV

NPIRI grind gauge Observations

| # | Grind Sample | Resin | Viscosity (Poise) | Scratch | Pepper |
|---|---|---|---|---|---|
| 1 | UCB-b-081103-02 (Standard) | Ebecryl 3411 | N.D. | 7 | Lots. |
| 2 | UCB flex-b-081203-01 | ViaFlex 165 | 81.0 | 0 | light to moderate |
| 3 | UCB Screen-b-08110305 | ViaScreen 515 | 331.5* | 4 | none |
| 4 | 135-b-081103-02 | Ashland D-30R | 66.7 | 0 | lots |
| 5 | 136-b-071603-02 | 7008-136 | 52.7 | 0 | none |
| 6 | 137-b-071603-03 | 7008-137 | 40.7 | 0 | none |
| 7 | 138-b-071603-04 | 7008-138 | 63.7 | 0 | none |
| 8 | 139-b-071603-05 | 7008-139 | 64.2 | 0 | none |
| 9 | 140-b-071603-06 | 7008-140 | 40.0 | 0 | none |
| 10 | 110-b-073103-01 | 7001-110 | 66.0 | 0 | none |
| 11 | 7001136-b-073103-02 | 7001-136 | 41.0 | 0 | none |
| 12 | 106-b-073103-02 | 7001-106 | 60.7 | 0 | none |
| 13 | 191-b-073103-03 | 7001-191 | 59.0 | 0 | none |
| 14 | 706901-081503-02 | 7069-001 | 68.5 | 0 | slight |

Viscosity (P) determined at 300 RPM or 100 RPM (*).

TABLE 5

Color Development in Pigment Dispersions

| | Clear bleach test | | | Gloss | Tint test | | |
|---|---|---|---|---|---|---|---|
| # | L | a | b | (60°) | L | a | b |
| 1 | 57.21 | −30.31 | −40.29 | 83.5 | 74.79 | −20.6 | −21.94 |
| 2 | 56.76 | −30.38 | −40.17 | 84.3 | 77.96 | −19.77 | −21.15 |
| 3 | 61.06 | −32.28 | −36.92 | 87.1 | 78.07 | −19.89 | −21.16 |
| 4 | 58.28 | −31.07 | −39.23 | 83.4 | 76.44 | −20.49 | −22.24 |
| 5 | 57.12 | −30.79 | −40 | 84 | 76.78 | −20.35 | −21.78 |
| 6 | 59.45 | −31.25 | −38.27 | 83.7 | 76.59 | −20.47 | −21.78 |
| 7 | 58.9 | −31.25 | −38.71 | 82.9 | 76.65 | −20.37 | −21.84 |
| 8 | 55.23 | −29.55 | −41.15 | 83.4 | 76.68 | −20.43 | −21.88 |
| 9 | 56.46 | −30.4 | −40.43 | 85.3 | 78.18 | −20 | −21.09 |
| 10 | 54.72 | −29.21 | −41.67 | 83.5 | 78.2 | −19.79 | −20.96 |
| 11 | 60.91 | −31.43 | −37.13 | 80.6 | 78.05 | −19.9 | −21 |
| 12 | 55.8 | −29.93 | −40.91 | 84.1 | 78.01 | −19.94 | −21.7 |
| 13 | 55.09 | −29.81 | −41.05 | 86.2 | 78.03 | −19.75 | −21.06 |
| 14 | 50.21 | −24.69 | −43.48 | 84.9 | 77.12 | −20.13 | −22.15 |

Tables V, XII, and XVI report color values as "L," "a," and "b" scale values. These designate the three axes in modern color theory: L is light-dark; a is green-red; b is blue-yellow. These are principles well understood by persons of skill in the coatings and graphic arts.

The resins of the present invention yielded much lower dispersion viscosities at a 30% pigment loading than did the commercial vehicles. This indicates that the resin vehicles disclosed herein advantageously have the capacity to disperse higher levels of pigment than do conventional vehicles. At equivalent 30% pigment loadings, the experimental vehicles experience much lower shear on the 3-roll mill in comparison to commercial formulas. Hence, color development, gloss, and transparency were slightly lower than for the published benchmark standard for some of the formulations. In the case of samples # 10, 12, 13 and 14, color and gloss properties were similar or better to those yielded by the published benchmark vehicle in spite of the lower pigment dispersion viscosity. This also indicates that the resins of the present invention are capable of higher pigment loading than the benchmark resin vehicles.

EXAMPLE 3

Comparative Benchmarking of White Pigment Dispersions

A white pigment, titanium dioxide (DuPont R-706®) was ground at 70% loading in all resins using a 3-roll mill using formulations specified in Table VI.

TABLE VI

Generic formulation for white pigment dispersion

| Component | Description | Parts (w/w) |
|---|---|---|
| Resin | Resin vehicle | 18.0 |
| R-706 | White Pigment | 42.0 |

TABLE VII

Resin Definitions

| Resin vehicle | Description | Viscosity |
|---|---|---|
| Ebecryl 3411 | epoxy acrylate | 498.70 |
| Viaflex 165 | UCB flexo grinding vehicle | 26.50 |
| Viascreen 515 | UCB screen grinding vehicle | 139.00 |
| 7008-135 (Ashland D-30R) | TMPEOTA/DPGDA/0.50 polyester acrylate/EAA 2.4 | 10.46 |

TABLE VII-continued

| Resin Definitions | | |
|---|---|---|
| Resin vehicle | Description | Vis-cosity |
| 7001-106 | 3 TMPEOTA/7 DPGDA/2-methoxyethyl acetoacetate 2.6/0.20 piperidine | 8.45 |
| 7069-01 | 3 TMPEOTA/4 DPGDA/SR 504 alkoxylated nonylphenol acrylate/2 polyester acrylate/ EAA 2.4 | 26.25 |

Viscosity (P at 25° C.).

EXAMPLE 4

Comparative Evaluation of the Pigment Dispersions

TABLE VIII

| NPIRI grind gauge Observations | | | | | |
|---|---|---|---|---|---|
| # | Grind Sample # | Resin vehicle | Viscosity (50 rpm) Aug. 20, 2003 | Scratch on NPIRI gauge (after 10 passes) | Pepper on NPIRI gauge (after 10 passes) |
| 1 | UCB-W-082803-01 (Standard) | Ebecryl 3411 | Too viscous, difficult to grind | 0 | 0 |
| 2 | UCBflex-W-082803-02 | Viaflex 165 | 681 P | 0 | Light |
| 3 | UCBScreen-W-082803-03 | Viascreen 515 | Too viscous, difficult to grind | 16 | Lots |
| 4 | 135-W-082803-04 | Ashland D-30R | 328 P | 0 | 0 |
| 5 | 106-W-082803-05 | 7001-106 | 207 P | 0 | 0 |
| 6 | 706901-W-082803-06 | 7069-01 | 538 P | 4 | Slight |

The resin vehicles of the present invention yielded much lower dispersion viscosities at 70% loading of the titanium dioxide white pigment than did conventional vehicles. This indicates that the resins of the present invention have the capacity to disperse higher levels of white pigment than do conventional vehicles, which is a distinct advantage.

EXAMPLE 5

Comparative Benchmarking of Yellow Pigment Dispersions

The yellow pigment YE-1400DC was ground at 30% loading in all resins using a 3-roll mill. The grind formulation is specified in Table IX.

TABLE IX

| Generic Formulation for Yellow Pigment Dispersion | | |
|---|---|---|
| Component | Description | Amount |
| Resin | Resin vehicle | 42.0 |
| YE-1400DC | Yellow pigment | 18.00 |

TABLE X

| Resin definitions for yellow dispersions. | | |
|---|---|---|
| Resin vehicle | Resin Description | Viscosity @ 25° C. (cp.) |
| Ebecryl 3411 | Epoxy Acrylate | 49,870 |
| Viaflex 165 | UCB flexo grinding vehicle | 2650 |
| Viascreen 515 | UCB Screen grinding vehicle | 13,900 |
| 7008-135 (Ashland D-30R) | TMPEOTA/DPGDA/0.50 polyester acrylate/EAA 2.4 | 1046 |
| 7001-106 | 3 TMPEOTA/7 DPGDA/2-methoxyethyl acetoacetate 2.6/0.20 piperidine | 845 |
| 7069-01 | 3 TMPEOTA/4 DPGDA/SR 504 alkoxylated nonylphenol acrylate/2 polyester acrylate/EAA 2.4 | 2625 |

TABLE XI

| NPIRI grind gauge Observations | | | | | |
|---|---|---|---|---|---|
| # | Grind Sample # | Resin vehicle | Viscosity (300 rpm) Aug. 20, 2003 | Scratch on NPIRI gauge (after 10 passes) | Pepper on NPIRI gauge (after 10 passes) |
| 1 | UCB-Y-082903-01 (Standard) | Ebecryl 3411 | 954 P (50 rpm) | 0 | Lots |
| 2 | UCBflex-Y-082903-02 | Viaflex 165 | 72.5 P | 0 | 0 |
| 3 | UCBScreen-Y-082903-03 | Viascreen 515 | 483 P (50 rpm) | 0 | 0 |
| 4 | 135-Y-082903-04 | Ashland D-30R | 56.7 P | 0 | 0 |
| 5 | 106-Y-082903-05 | 7001-106 | 80.7 P | 0 | 0 |
| 6 | 706901-Y-082903-06 | 7069-01 | 50.2 P | 0 | 0 |

TABLE XII

| Color Development in Pigment Dispersions | | | | | | | |
|---|---|---|---|---|---|---|---|
| | Clear bleach test | | | Gloss | Tint test | | |
| # | L | a | b | (60°) | L | a | b |
| 1 | 86.59 | −6.62 | 79.58 | 85.7 | 93.7 | −4.72 | 33.13 |
| 2 | 86.22 | −6.15 | 81.87 | 86 | 93.79 | −4.58 | 32.84 |
| 3 | 86.65 | −7.1 | 80.57 | 89.7 | 93.91 | −5.07 | 33.71 |
| 4 | 86.43 | −6.31 | 80.45 | 86.7 | 93.85 | −4.63 | 33.22 |
| 5 | 86.04 | −5.53 | 84.71 | 89.3 | 93.9 | −4.49 | 32.62 |
| 6 | 86.59 | −6.62 | 79.58 | 85.7 | 93.7 | −4.72 | 33.13 |

The resin vehicles of the present invention yielded much lower dispersion viscosities at 30% loadings of the yellow pigment than did conventional vehicles. This indicates that the inventive vehicles have the capacity to disperse higher levels of yellow pigment than do conventional vehicles, which is a distinct advantage. In the current evaluation, the resin vehicles of the present invention, at 30% pigment and lower viscosity, would not have experienced as much shear on the 3-roll mill compared to conventional formulas. Nonetheless, color and gloss properties were similar or better to those yielded by conventional vehicles. This also indicates that the resins of the present invention are capable of higher pigment loading than the benchmark resin vehicles.

EXAMPLE 7

Comparative Benchmarking of Red Pigment Dispersions

Red pigment LR-1392 was ground at 30% loading in all resins using a 3-roll mill. The grind formulation is specified in Table XIII.

TABLE XIII

| Generic Formulation for Red Pigment Dispersion | | |
|---|---|---|
| Component | Description | Amount |
| Resin | Resin vehicle | 42.0 |
| LR-1392 | Red pigment | 18.00 |

TABLE XIV

| Constituents of Experimental Resins for Red Inks. | | |
|---|---|---|
| Resin vehicle | Resin Description | Viscosity @ 25° C. (cp.) |
| Ebecryl 3411 | Epoxy Acrylate | 49,870 |
| Viaflex 165 | UCB flexo grinding vehicle | 2650 |
| Viascreen 515 | UCB Screen grinding vehicle | 13,900 |
| 7008-135 (Ashland D-30R) | TMPEOTA/DPGDA/0.50 polyester acrylate/EAA 2.4 | 1046 |
| 7001-106 | 3 TMPEOTA/7 DPGDA/2-methoxyethyl acetoacetate 2.6/0.20 piperidine | 845 |
| 7069-01 | 3 TMPEOTA/4 DPGDA/SR 504 alkoxylated nonylphenol acrylate/2 polyester acrylate/EAA 2.4 | 2625 |

EXAMPLE 7

Comparative Evaluation of the Pigment Dispersions

TABLE XV

| NPIRI grind gauge Observations | | | | | |
|---|---|---|---|---|---|
| # | Grind Sample # | Resin vehicle | Viscosity (300 rpm) Aug. 20, 2003 | Scratch on NPIRI gauge (after 10 passes) | Pepper on NPIRI gauge (after 10 passes) |
| 1 | UCB-R-082503-01 (Standard) | Ebecryl 3411 | 961 P (50 rpm) | 6 | Lots |
| 2 | UCBflex-R-082503-02 | Viaflex 165 | 46.2 P | 2 | None |
| 3 | UCBScreen-R-082503-03 | Viascreen 515 | 597 P (50 rpm) | 7 | Lots |
| 4 | 135-R-082503-04 | Ashland D-30R | 73.0 P | 2 | Some |
| 5 | 106-R-082503-05 | 7001-106 | 53.2 P | 3 | Some |
| 6 | 706901-082503-06 | 7069-01 | 98.2 P | 3 | Some |

TABLE XVI

| Color development in pigment dispersions | | | | | | | |
|---|---|---|---|---|---|---|---|
| | Clear bleach test | | | Gloss | Tint test | | |
| # | L | a | b | (60°) | L | a | b |
| 1 | 49.25 | 54.97 | 0.28 | 78.3 | 76.75 | 24 | −1.9 |
| 2 | 46.88 | 55.78 | 4.37 | 86.45 | 75.38 | 25.27 | −2.5 |
| 3 | 56.63 | 48.96 | −6.86 | 84.3 | 79.79 | 20.99 | −0.25 |
| 4 | 46.67 | 55.44 | 4.33 | 79.7 | 75.87 | 24.85 | −2.51 |
| 5 | 46.17 | 55.52 | 5.63 | 84.7 | 76.12 | 24.48 | −2.61 |
| 6 | 47.35 | 55.18 | 3.18 | 84.2 | 75.97 | 24.53 | −3.68 |

Dispersions formed from resins of the present invention had much lower viscosities when loaded with 30% of a red pigment in comparison to conventional vehicles. This indicates that resins of the present invention have the capacity to disperse higher levels of red pigment than do conventional vehicles, which is a distinct advantage. Moreover, NPIRI grind gauge evaluations indicate that a fewer number of passes is required to grind the pigment in resins of the present invention compared to conventional resins, which is another distinct process advantage. In the current evaluation, the resins of the present invention, at 30% pigment and lower viscosity, would not have experienced as much shear on the 3-roll mill as did the formulations based on commercial resins. Nonetheless, gloss properties were similar or better to those yielded by conventional resins. This also indicates that the inventive resins are capable of higher pigment loadings than the benchmark resin vehicles.

The present invention provides resins that have better pigment wetting characteristics and better grindability compared to conventional vehicles. Higher pigment loading levels are possible with the inventive resins at the grinding stage on a 3-roll mill. A 30-32% loading of red, blue and yellow pigments was realized with the inventive resins compared to a maximum possible loading of 25% with the commercial vehicles. In the case of the white pigment, a 70% pigment loading was possible with resins of the present invention compared to 60% loading with the commercial resin. Also, NPIRI grind gauge evaluations indicate that fewer passes are required to grind the pigments loaded in resins of the present invention compared to the standard. This is a distinct process advantage. A further advantage is obtained because the inventive resins are self photo-initiating, thus reducing significantly the photoinitiator loading in ink formulations derived from these dispersions.

We claim:

1. A Michael resin-pigment dispersion, said pigment dispersion comprising:

from about 10 parts, by weight, to about 90 parts, by weight, of a Michael dispersion resin and from about 10 parts, by weight, to about 75 parts, by weight, of a pigment; wherein said Michael dispersion resin comprises a Michael Addition reaction product of:

a monomer or oligomer serving the function of Michael acceptor and providing pendant acrylate groups for crosslinking;

a monomer or oligomer serving the function of pigment wetting;

a monomer or oligomer serving the function of pigment stabilization;

a monomer or oligomer serving the function of viscosity control;

a constituent serving the function of cure enhancement of final ink formulation; and a constituent serving the function of Michael donor providing a photolabile chromophore.

2. The Michael resin-pigment dispersion, according to claim 1, wherein said monomer or oligomer serving the function of pigment wetting is selected from the group consisting of polyester acrylates, epoxy acrylates, urethane acrylates, acrylic monomers, and mixtures thereof.

3. The Michael resin-pigment dispersion, according to claim 2, wherein a preferred pigment wetting monomer is selected from the group consisting of propoxylated and ethoxylated polyacrylates.

4. The Michael resin-pigment dispersion, according to claim 3, wherein a most preferred pigment wetting monomer is TMPEOTA.

5. The Michael resin-pigment dispersion, according to claim 2, wherein a most preferred Michael donor and photolabile chromophore providing constituent is 2-methoxyethyl acetoacetate.

6. The Michael resin-pigment dispersion, according to claim 1, wherein said monomer or oligomer serving the function of pigment dispersion stabilization is selected from the group consisting of polyester acrylates, epoxy acrylates, urethane acrylates and acrylic monomers, and mixtures thereof.

7. The Michael resin-pigment dispersion, according to claim 1, wherein said monomer or oligomer serving the function of viscosity control is selected from the group consisting of polyester acrylates, epoxy acrylates, urethane acrylates, acrylic monomers, and mixtures thereof.

8. The Michael resin-pigment dispersion, according to claim 7, wherein a preferred viscosity control monomer is selected from the group consisting of ethylene glycol diacrylate, propylene glycol diacrylate, diethylene glycol diacrylate, dipropylene glycol diacrylate (DPGDA), triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resoxcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyolohexanedimethanol diacrylate, propoxylated cyclohexanedimethazzol diacrylate, aryl urethane diacrylate, aliphatic urethane diacrylate, polyester diacrylate, and mixtures thereof, glycerol triacrylate, ethoxylated trimethyloipropane triacrylate (TMPEOTA), propoxylated trimethyloipropane triacrylate, ethoxylated glycerol triarrylate, propoxylated glycerol triacrylate, pentaerytbritol triacrylate, aryl urethane triacrylates, aliphatic urethane triacrylates, melamine triacrylates, epoxy novolac triacrylates, aliphatic epoxy triacrylate, polyester triacrylate, pentaerythritol tetraacrylate, ethoxylated pentaerytbritol tetreacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetreacrylates, aliphatic urethane tetraacrylates, melamine tetraacrylates, epoxy novolac tetraacrylates, polyester tetraacrylates and mixtures thereof.

9. The Michael resin-pigment dispersion, according to claim 8, wherein a most preferred viscosity control monomer is DPGDA.

10. The Michael resin-pigment dispersion, according to claim 7, wherein a most preferred cure enhancing constituent is diethanol amine.

11. The Michael resin-pigment dispersion, according to claim 1, wherein said constituent serving the function of cure enhancement of the final ink formulation is selected from the group consisting of amine-modified polyether acrylates, amine-modified polyester acrylates, amine-modified epoxy acrylates, amine-modified urethane acrylates, amino acrylates, primary or secondary amines capable of undergoing pseudo Michael Addition reactions with acrylate moieties, and mixtures thereof.

12. The Michael resin-pigment dispersion according to claim 11, wherein a preferred cure-enhancing constituent is selected from the group consisting of amine-modified polyether acrylates, amine-modified polyester acrylates, and combinations thereof.

13. The Michael resin-pigment dispersion, according to claim 1, wherein said constituent serving the function of Michael donor providing a photolabile chromophore is selected from the group consisting of ethyl acetoacetate, methyl acetoacetate, 2-ethylhexyl acetoacetate, lauryl acetoacetate, t-butyl acetoacetate, acetoacetanilide, N-alkyl acetoacetanilide, acetoacetanilide, 2-acetoacetoxylethyl acrylate, 2-acetoacetoxylethyl methacrylate, allyl acetoacetate, benzyl acetoacetate, 2,4-pentanedione, 2,4-hexanedione, 3,5-heptanedione, isobutyl acetoacetate, and 2-methoxyethyl acetoacetate, 1,4-butanediol diacetoacetate, 1,6-hexanediol diacetoacetate, neopentyl glycol diacetoacetate, cyclohexane dimethanol diacetoacetate, ethoxylated bisphenol A diacetoacetate, trimethylol propane triacetoacetate, polycaprolactone triacetoacetates, long chain alkoxylated acetoacetates, pentaerytbritol tetraacetoacetate, and mixtures thereof.

14. The Michael resin-pigment dispersion, according to claim 13, wherein a preferred Michael donor and photolabile chromophore constituent is selected from the group consisting of BAA, 2-MBAA, and long chain alkoxylated acetoacetates.

15. The Michael resin-pigment dispersion, according to claim 1, wherein said monomer or oligomer serving the function of pigment wetting is present at from about 50 parts to about 90 parts.

16. The Michael resin-pigment dispersion, according to claim 1, wherein said monomer or oligomer serving the function of pigment stabilization is present at up to about 50 parts.

17. The Michael resin-pigment dispersion, according to claim 1, wherein said monomer or oligomer serving the function of viscosity control is present at up to about 90 parts.

18. The Michael resin-pigment dispersion, according to claim 1, wherein said monomer, oligomer or constituent serving the function of cure enhancement of final ink formulation is present at up to about 90 parts.

19. The Michael resin-pigment dispersion, according to claim 1, wherein said constituent serving the function of Michael donor and providing a photolabile chromophore is present at from about 5 amount parts to about 50 parts.

20. The Michael resin-pigment dispersion, according to claim 1, wherein said pigment is selected from the group consisting of white pigments, yellow pigments, red pigments and blue pigments.

21. The Michael resin-pigment dispersion, according to claim 20, wherein said white pigment is selected from the group consisting of titanium dioxide, zinc oxide, and barium sulfate.

22. The Michael resin-pigment dispersion, according to claim 20, wherein said yellow pigment is selected from the group consisting of diarylide yellow, arylide yellow, benzimidazolone yellows, organic, and inorganic pigments.

23. The Michael resin-pigment dispersion, according to claim 20, wherein said blue pigment is selected from the group consisting of phthalocyanine blues and other organic and inorganic blue pigments.

24. The Michael resin-pigment dispersion, according to claim 20, wherein said red pigment is selected from the group consisting of metallized azo reds, naphthol reds, and quinacridone reds.

25. A method of fabricating the Michael resin-pigment dispersion according to claim 1, the method comprising:

providing from about 10 parts, by weight to about 75 parts, by weight of said pigment;

wetting said pigment with from about 10 parts, by weight to about 90 parts, by weight of said Michael dispersion resin; and grinding said pigment in said Michael dispersion resin forming a dispersion.

26. The method of fabricating the Michael resin-pigment dispersion, according to claim 25, wherein wetting said pigment comprises mixing pigment and said Michael dispersion resin in a mixing device operating at high shear.

27. The method of fabricating the Michael resin-pigment dispersion, according to claim 26, wherein wetting said pigment comprises dispersion in a Hauschild mixer, Ross mixer or an air mixer.

28. The method of fabricating the Michael resin-pigment dispersion, according to claim 25, wherein grinding said pigment comprises passing said Michael dispersion resin and said pigment through a media mill selected from the group consisting of three-roll mills and horizontal media mills.

29. A Michael dispersion resin comprising: about 37.7 wt. % TMPEOTA; about 26.4 wt. % DPGDA; about 21.3 wt. % of an amine-modified polyester acrylate; and about 12 wt. % EAA.

30. A Michael dispersion resin comprising: about 34.2 wt. % TMPEOTA; about 45.2 wt. % DPGDA; about 16.4 wt. % 2-MEAA; and about 1.7 wt. % piperidine.

* * * * *